US011999606B2

(12) United States Patent
Graffin

(10) Patent No.: US 11,999,606 B2
(45) Date of Patent: Jun. 4, 2024

(54) DEVICE FOR FILLING CONTAINERS

(71) Applicant: Serac group, La Ferte Bernard (FR)

(72) Inventor: André Jean-Jacques Graffin, Chicago, IL (US)

(73) Assignee: SERAC GROUP, La Ferte Bernard (FR)

( * ) Notice: Subject to any disclaimer, the term of this patent is extended or adjusted under 35 U.S.C. 154(b) by 156 days.

(21) Appl. No.: 17/599,959

(22) PCT Filed: Apr. 10, 2020

(86) PCT No.: PCT/EP2020/060347

§ 371 (c)(1),
(2) Date: Sep. 29, 2021

(87) PCT Pub. No.: WO2020/208244

PCT Pub. Date: Oct. 15, 2020

(65) Prior Publication Data

US 2022/0169489 A1 Jun. 2, 2022

(30) Foreign Application Priority Data

Apr. 12, 2019 (FR) ...................................... 1903960

(51) Int. Cl.
*B67C 3/28* (2006.01)
*B67C 3/00* (2006.01)
*B67C 3/20* (2006.01)
*B67C 3/24* (2006.01)

(52) U.S. Cl.
CPC .............. *B67C 3/287* (2013.01); *B67C 3/001* (2013.01); *B67C 3/202* (2013.01); *B67C 3/24* (2013.01)

(58) Field of Classification Search
CPC .... B67C 3/22; B67C 3/26; B67C 3/28; B67C 3/287; B67C 3/001; B67C 3/202; B67C 3/24; B67C 3/248
See application file for complete search history.

(56) References Cited

U.S. PATENT DOCUMENTS 3,626,998 A * 12/1971 Trusselle .................. B67C 3/26 141/198
4,476,534 A * 10/1984 Schlosser ............. G05B 19/042 141/90
5,832,965 A * 11/1998 Fasse ........................ B65B 3/12 141/20
6,375,050 B1 * 4/2002 Gruson ................. B67C 3/2608 222/504

(Continued)

FOREIGN PATENT DOCUMENTS

DE 3019940 A1 12/1981
EP 2604571 A1 6/2013

(Continued)

*Primary Examiner* — Nicolas A Arnett
(74) *Attorney, Agent, or Firm* — MUNCY, GEISSLER, OLDS & LOWE, P.C.

(57) ABSTRACT

The invention relates to a device for filling a bottle with a liquid product, comprising support means for the bottle and a filling nozzle (11) arranged above the support means. The device comprises a first actuator for movement of a valve of the filling nozzle and a second actuator for movement of one of the support member and the filling nozzle between high and low positions, the actuators being connected to a control unit.

13 Claims, 3 Drawing Sheets

(56) References Cited

U.S. PATENT DOCUMENTS

| | | | | |
|---|---|---|---|---|
| 9,856,125 | B2 * | 1/2018 | Clüsserath | B67C 3/2634 |
| 9,862,585 | B2 * | 1/2018 | Ramnarain | B65B 43/52 |
| 2017/0129759 | A1 * | 5/2017 | Cocchi | G01G 17/06 |

FOREIGN PATENT DOCUMENTS

| | | | | |
|---|---|---|---|---|
| EP | 2930139 | A1 * | 10/2015 | B67C 3/007 |
| WO | WO-01/40098 | A1 | 6/2001 | |

* cited by examiner

DEVICE FOR FILLING CONTAINERS

The present invention relates to filling containers with liquid, and more particularly to a device for filling bottles. The invention also relates to a filling method making use of such a device.

BACKGROUND OF THE INVENTION

Industrial filling installations are known that comprise rotary platforms provided with plunger spouts, and with means for bringing bottles onto the rotary platforms under the plunger spouts. Each plunger spout has an upper end connected to a liquid distribution circuit and a lower end provided with a cannula of dimensions suitable for being engaged in the bottles. Each plunger spout is provided with a valve controlling the flow of liquid and is mounted to move vertically in such a manner that the cannula can be engaged in bottles in order to begin filling them from the bottom up, and can then rise vertically progressively as the bottles become filled.

Such installations generally include two stationary cam paths, one serving to switch positive displacement pumps between a suction position and a discharge position by controlling corresponding valves, and the other controlling the lowering and the raising of the plunger spouts between their high and low positions. In this way, the high position of a plunger spout is always in phase with the quantity of liquid that has been inserted into a bottle, thereby ensuring, throughout the time a bottle is being filled, that the plunger spout is in a predetermined position relative to the level of the liquid in the bottle.

In other installations, the plunger spouts are stationary, and it is seats on which the bottles are placed that move up and down.

Nevertheless, any changes to the dimensions of the bottles, and more particularly to the height of the bottles, can give rise to the shape of the cam being adjusted or modified in order to lengthen or shorten the stroke of the plunger spout or the stroke of the seat, thereby giving rise once again to numerous manipulations and to the installation being stopped, and thus to a drop in the productivity of the installation.

Furthermore, the cleaning of such an installation generally requires additional tooling that needs to be correctly positioned relative to the plunger spouts prior to proceeding with cleaning them.

OBJECT OF THE INVENTION

An object of the invention is thus to propose a filler device serving to obviate the above-mentioned problems, at least in part.

SUMMARY OF THE INVENTION

To this end, the invention provides a filler device for filling a bottle with liquid, the device comprising a support member for supporting the bottle and a filler spout arranged above the support member so that at least one of the support member and the filler spout is movable between a start-of-filling position and an end-of-filling position. The filler spout comprises a tubular body having an upper portion connected to a liquid distribution circuit and having a lower portion shaped as a cannula, a valve being mounted inside the tubular body to be movable between an open position and a closed position.

According to the invention, the device includes a first electromechanical actuator connected to the valve to move it between its two positions, a second electromechanical actuator connected to at least one of the support member and the filler spout to move it between its two positions, and electronic means for controlling and synchronizing the two actuators relative to each other.

Thus, the filler device of the invention is adapted to filling bottles of different types. Specifically, the settings for the start and the end of liquid distribution and also the start-of-filling and the end-of-filling positions for at least one of the support member and the filler spout are obtained from the settings of the electronic means of the control unit. As a result, for each type of bottle, at least one of the support member and the filler spout can be moved by the second actuator in such a manner that the free end of the filler cannula extends in the proximity of the bottom of the bottle in the start-of-filling position and that the cannula is outside said bottle in the end-of-filling position.

Furthermore, the filler device of the invention makes it possible to select the position of the filler cannula throughout the filling operation, in particular in order to take account of the shape of the bottle.

In particular manner, the support member for supporting the bottle comprises a tray arranged to receive the bottom of the bottle.

In particular manner, the support member for supporting the bottle comprises a plate arranged to receive the neck of the bottle.

In particular manner, the filler spout and the support member for supporting the bottle are mounted on a turret that is rotatable about a substantially vertical axis.

According to a particular characteristic, the filler device includes a measurement unit for measuring the quantity of liquid contained in the bottle.

In particular manner, the support member includes a strain gauge arranged to measure the weight of the bottle and connected to the measurement unit, which is arranged to calculate the quantity of liquid inserted into said bottle from the weight of the bottle.

Advantageously, the filler device includes a control unit arranged to control the first actuator as a function of the quantity of liquid and to control the second actuator so as to move at least one of the support member and the filler spout from the start-of-filling position towards the end-of-filling position as a function of the quantity of liquid measured by the measurement device.

In particular manner, the first actuator and/or the second actuator is a servomotor, a stepper motor, or a linear electromagnetic actuator.

According to another particular characteristic, the filler device includes a cleaning manifold arranged under the bottle support member, the second actuator enabling the filler spout to be moved towards a cleaning position in which the free end of the filler cannula is engaged in an inlet orifice of the cleaning manifold. The start-of-filling position lies between the end-of-filling position and the cleaning position.

The invention also provides a dispensing method making use of a filler device comprising bottle support members having respective filler spouts mounted vertically in register therewith, each being fitted with a valve that is controlled by a first actuator as a function of measurement means for measuring the quantity of liquid inserted into the bottle, at least one of the support member and the filler spout being mounted to be moved vertically relative to the other by a second actuator.

According to the invention, the method comprises the following steps:

- installing a bottle on the support member;
- controlling the second actuator to move at least one of the support member and the filler spout from the end-of-filling position to the start-of-filling position;
- controlling the first actuator to move the valve from the closed position to the open position;
- controlling the second actuator to move at least one of the support member and the filler spout from the start-of-filling position to the end-of-filling position;
- when the quantity of liquid measured by the measurement means reaches a predetermined value, controlling the first actuator to move the valve from the open position to the closed position;
- when at least one of the support member and the filler spout is in the end-of-filling position, removing the bottle from the support means.

In particular manner, the method includes a prior step of measuring the height of a bottle and of setting the control of the second actuator to adjust the height of the end-of-filling position as a function of the height of the bottle.

In particular manner, the method includes a step of adjusting the travel speed of at least one of the support member and the filler spout as imparted by the second actuator as a function of at least one of the following parameters:

- bottle shape;
- the viscosity of the liquid;
- the desired rate of filling.

In particular manner, the method includes a step of adjusting a relationship for moving the valve of the filler spout by the first actuator as a function of at least one of the following parameters:

- bottle shape;
- the viscosity of the liquid;
- the desired rate of filling.

BRIEF DESCRIPTION OF THE DRAWINGS

The invention can be better understood in the light of the following description, which is purely illustrative and non-limiting, and which should be read with reference to the accompanying drawings, in which.

DETAILED DESCRIPTION OF THE INVENTION

Figure 1:
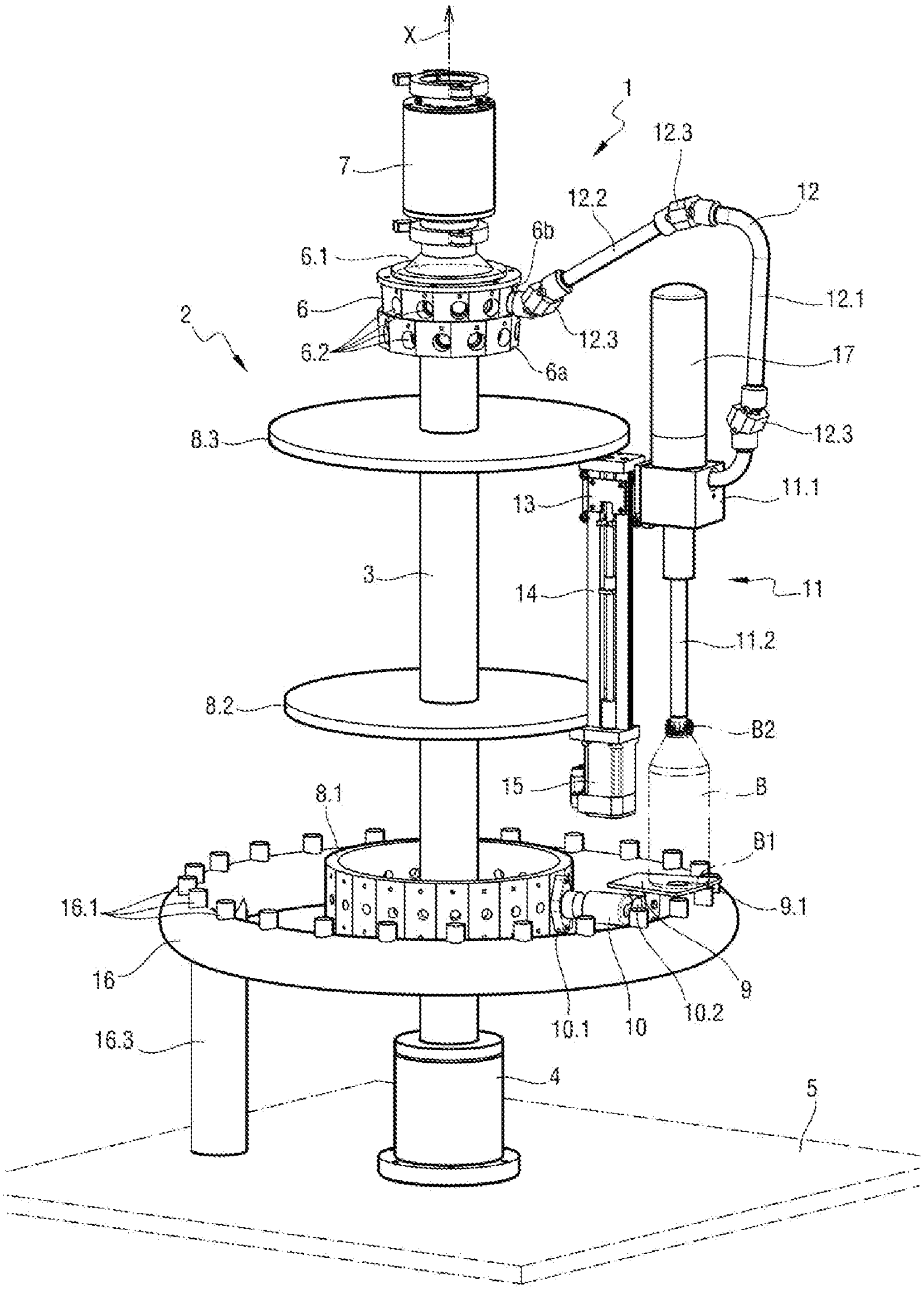
FIG. 1 is a perspective view of a filler device in a particular embodiment of the invention, the filler spout being in a disengaged position.

With reference to FIG. 1, a filler device 1 in a particular embodiment of the invention comprises a turret 2 mounted to rotate about a substantially vertical axis X. The turret 2 comprises a tubular body 3 extending along the axis X and having a bottom end that is received in a sleeve 4 fastened on a substantially horizontal support surface 5. The sleeve 4 is arranged to guide and drive rotation of the tubular body 3 about the axis X by using drive means (not shown herein). At its opposite end, there is fastened a substantially cylindrical body 6 that defines a liquid distribution chamber.

The distribution chamber includes an inlet orifice 6.1 arranged on a top wall of the cylindrical body 6. The inlet orifice 6.1 is connected in leaktight manner to a bottom end of a rotary coupling 7 that has an upper end for connecting in leaktight manner to a source for feeding a liquid or "product" P.

The distribution chamber also has a plurality of outlet orifices 6.2 uniformly distributed around the axis X in a bottom side wall 6*a* and in a top side wall 6*b* of the cylindrical body 6. In this example, the number of orifices is equal to 24. Thus, 12 of the 24 outlet orifices 6.2 are uniformly distributed in the bottom side wall 6*a* and the other 12 are uniformly distributed in the top side wall 6*b*.

Furthermore, first, second, and third platforms 8.1, 8.2, and 8.3 are fastened coaxially around the tubular body 3 so as to rotate at the same speed as the tubular body 3. The first and third platforms 8.1 and 8.3 are respectively in the proximity of the sleeve 4 fastened on the support surface 5 and in the proximity of the tubular body 6 defining the distribution chamber, while the second platform 8.2 is arranged between the first and third platforms 8.1 and 8.3.

Figure 2:
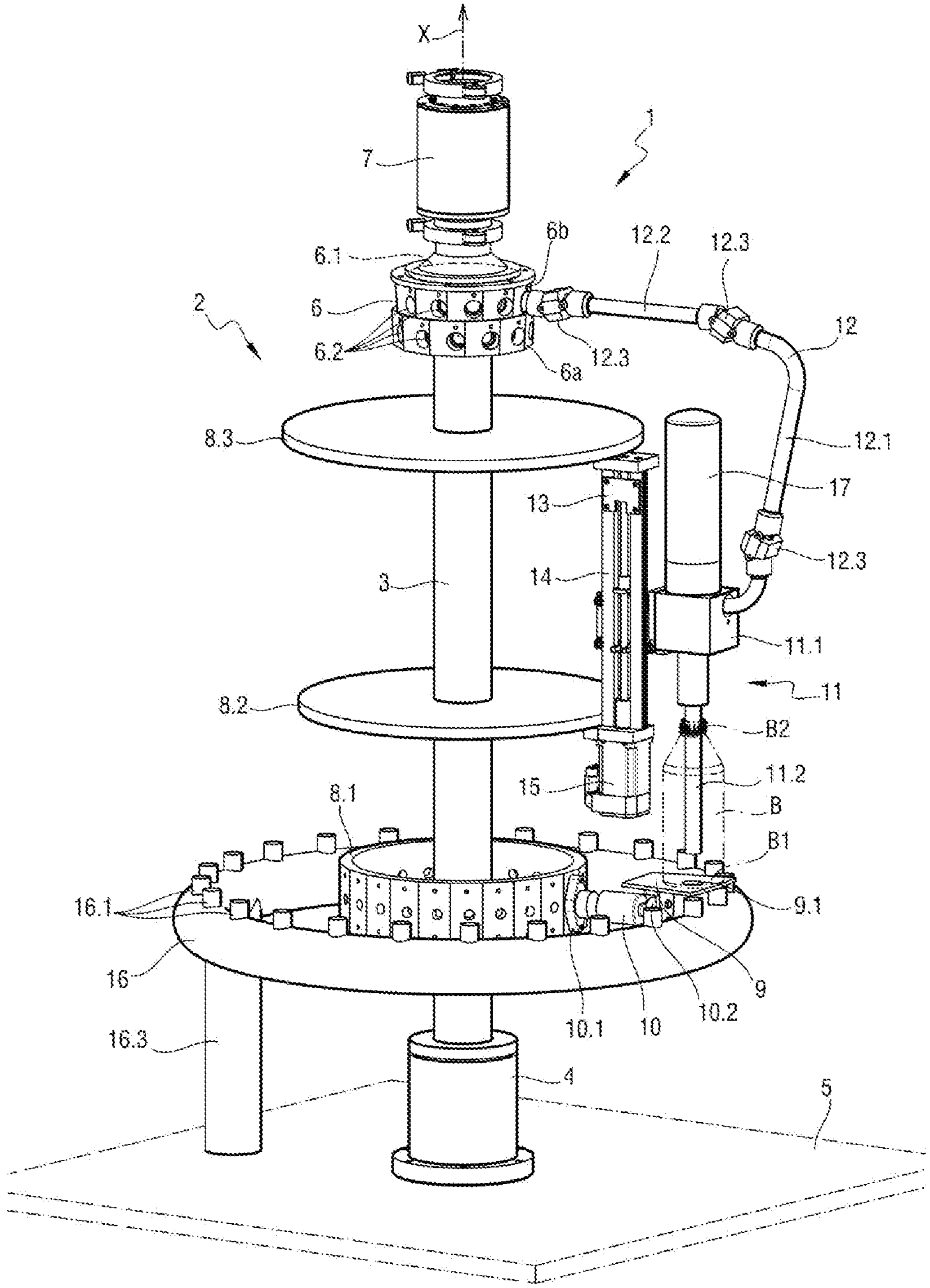
FIG. 2 is a view analogous to FIG. 1, the filler spout being in an engaged position.
Figure 3:
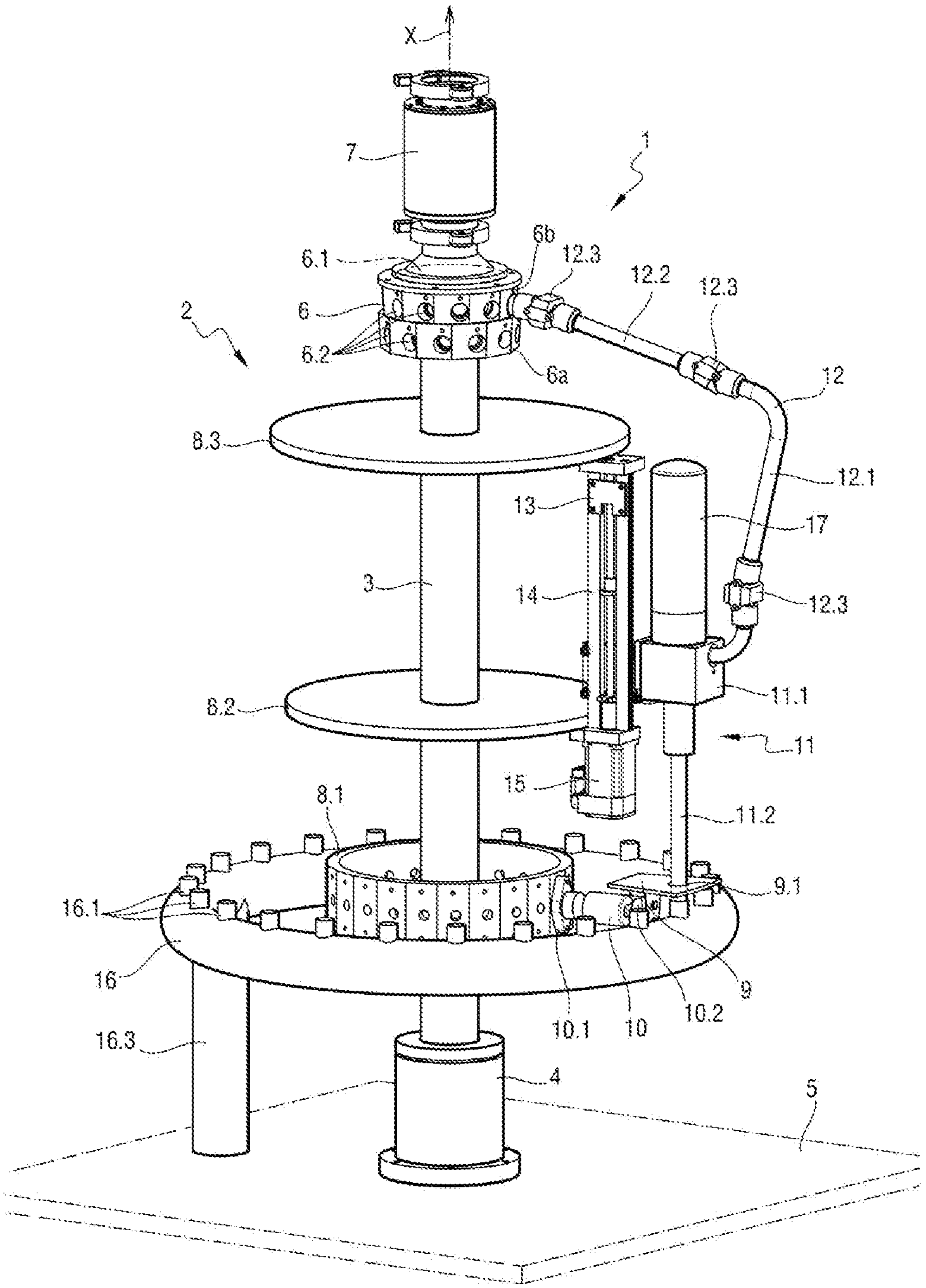
FIG. 3 is a view analogous to FIG. 1, the filler spout being in a cleaning position.

The turret 2 also has a plurality of identical horizontal trays 9 that are distributed uniformly around the axis X. In this example, the number of trays is equal to the number of outlet orifices 6.2 of the distribution chamber, i.e. 24. For reasons of clarity, only one tray 9 is shown in FIGS. 1 to 3. Each tray 9 is shaped to receive the bottom surface B1 of a bottle B having a top opening B2, and it is connected to the first platform 8.1 by a bar 10 provided with a strain gauge 10 arranged to measure the weight of the bottle B and its content. In this example, the bars 10 extend substantially radially relative to the tubular body 3 of the turret 2, with a proximal end 10.1 of each bar 10 being connected to the first platform 8.1, while a distal end 10.2 of each bar 10 is connected to the tray 9.

Above each tray 9 there is arranged a filler spout 11 of the plunger type, and in this example it is arranged to discharge liquid substantially horizontally. The filler spout 11 comprises a tubular body defining, in an upper portion, a liquid feed chamber 11.1, and, in a lower portion, a filler cannula 11.2 extending along the same axis as the feed chamber 11.1. The feed chamber 11.1 is connected by a pipe 12 to a respective outlet orifice 6.2 of the distribution chamber, and the filler cannula 11.2 is arranged to be engaged in the bottle B via its top opening B2.

A valve mounted inside of the feed chamber 11.1 of the filler spout 11 is connected to a first actuator 17 to move the valve between an open position allowing the liquid to flow from the tubular body to the filler cannula 11.2, and a closed position preventing the liquid from flowing from the tubular body to the filler cannula 11.2.

The filler spout 11 is fastened to a screw carriage 13 mounted to move along a structure 14 extending substantially vertically and fastened in a low portion to a peripheral surface of the second platform 8.2 and in a high portion to a peripheral surface of the third platform 8.3.

The carriage 13 is connected to a second actuator 15 serving in particular to move the filler spout 11 substantially vertically between a high position, or "disengaged" position, in which the filler cannula 11.2 is outside of the bottle (FIG. 1), and a first low position, or "engaged" position, in which the filler cannula 11.2 is engaged inside of the bottle B, with the free end of said filler cannula then extending in the proximity of the bottom of said bottle B (FIG. 2).

By way of example, the first actuator 17 may be a linear electromechanical actuator, a servomotor, or a stepper motor driving rotation of a worm screw cooperating with a nut fastened to the valve so as to have its axis substantially vertical.

By way of example, the second actuator 15 may be a linear electromechanical actuator, a servomotor, or a stepper motor driving rotation of a worm screw cooperating with a nut fastened to the carriage 13 so as to have its axis substantially vertical.

A programmable control unit UC (not shown) is connected to the strain gauge and is arranged to control the first actuator 17 and the second actuator 15.

The filler device 1 also includes a cleaning manifold 16 of annular shape that is fastened to the support surface 5 so as to extend coaxially around the tubular body 3 of the turret 2, thus being coaxial about the same axis as the first, second, and third platforms 8.1, 8.2, and 8.3. The cleaning manifold 13 is arranged a little below the trays 9 for receiving the bottles B, and facing each of the filler spouts 11 it includes a respective projecting inlet orifice 16.1 arranged to receive the free end of the filler cannula 11.2. It should be observed that facing each of the filler spouts, each tray 9 has a hole 9.1 arranged to enable the filler cannula 11.2 to pass through said tray 9 so as to reach the inlet orifice 16.1 of the cleaning manifold 16.

In addition to enabling the filler spout 11 to move between the disengaged position and the engaged position, the carriage 13 controlled by the second actuator 15 also serves to move the filler spout 11 substantially vertically between the engaged position and a second low position, or "cleaning" position, in which the free end of the filler cannula 11.2 is engaged in one of the inlet orifices 16.1 of the cleaning manifold 16 (FIG. 3). The engaged position thus lies between the disengaged position and the cleaning position.

It should be observed that the pipe 12 connecting the feed chamber 11.1 of the filler spout 11 to the distribution chamber defined by the cylindrical body 6 is arranged to ensure that said filler spout 11 is fed with liquid regardless of the position of the filler spout 11. In this example, the pipe 12 comprises first and second rigid segments 12.1 and 12.2 that are connected together by a first swivel joint 12.3, the first segment 12.1 and the second segment 12.2 being connected respectively to an outlet orifice 6.2 of the distribution chamber and to an inlet orifice of the feed chamber 11.1 of the filler spout 11 by second and third swivel joints 12.3.

There follows a detailed description of the operation of the filler device 1.

While the turret 2 is rotating about the axis X at a speed that is substantially constant, a bottle B that is to be filled with liquid is brought onto the tray 9 so that the top opening B2 of the bottle B is facing the filler cannula 11.2 of the plunger spout 11. The plunger spout 11 is then in the disengaged position and the valve mounted inside the feed chamber 11.1 of the filler spout 11 is in its closed position (FIG. 1).

In a first stage, the control unit UC causes the second actuator 15 to bring the filler spout 11 into the engaged position. The free end of the filler cannula 11.2 then extends inside the bottle B, in the proximity of the bottom of the bottle B (FIG. 2). Movement of the filler spout 11 towards the engaged position may naturally be dependent on the strain gauge 10 detecting that a bottle B is present on the tray 9.

The control unit UC then causes the first actuator 17 to bring the valve mounted inside the feed chamber 11.1 of the filler spout 11 into the open position in which the liquid flows from the feed chamber 11.1 of the tubular body into the filler cannula 11.2 in order to form a jet of liquid that escapes substantially horizontally from the free end of the filler cannula 11.2. Thus, the weight of the bottle increases progressively as the liquid flows into the bottle B.

When the weight of the bottle B as measured by the strain gauge 10 reaches a determined initial value, the second actuator 15 is controlled once again by the control unit UC, now to move the filler spout 11 away from the engaged position towards the disengaged position, while the liquid continues to flow into the bottle B. Advantageously, the movement of the filler spout is synchronized with the quantity of liquid contained in the bottle B as measured by the strain gauge. In this way, depending on the nature of the liquid P, it is possible to ensure that, throughout filling, the filler spout 11 is continuously either above the level of the liquid contained in the bottle or else immersed to a small extent in the liquid, in particular when the liquid is liable to froth.

As soon as the weight of the bottle B as measured by the strain gauge 10 reaches a predetermined final value, the first actuator 17 is controlled by the control unit UC to bring the valve mounted inside the feed chamber 11.1 of the filler spout 11 into its closed position, thereby stopping filling of the bottle B. The filler spout 11 then continues to rise until it reaches the disengaged position. The bottle B can then be removed from the tray 9, and by way of example it can receive a stopper on the top opening B2 of the bottle B.

Under such circumstances, it should be observed that the movement of the filler spout 11 is independent of the angular position of the turret 2. Furthermore, it should be observed that the speed with which the bottle B is filled is independent of the speed of rotation of the turret 2.

In the event of filling a bottle B' of shape and height that are different from the bottle B, it suffices merely to reprogram the control unit UC in order to define:

- a new disengaged position, possibly together with a new engaged position, thereby matching the stroke of the filler spout to the shape and the height of the bottle B'; and
- a travel speed for the filler spout and/or a new control relationship for the valve in order to match the filling flow rate to the shape of the bottle.

In the event of the bottle B being wrongly positioned on the tray 9, while the filler cannula 11.2 of the filler spout 11 is being lowered, it is likely to come to bear against a wall of said bottle B, thereby giving rise to abnormal mechanical forces that can be detected by the strain gauge 10. By way of example, the control unit UC could then be programmed to trigger an audible and/or visible warning, and indeed to stop lowering the filler spout, and possibly even to cause it to be raised.

When it is necessary to clean the filler spout 11, the control unit UC causes the second actuator 15 to move the filler spout 11 to the cleaning position (FIG. 3). Movement of the filler spout 11 towards the cleaning position may naturally be dependent on the strain gauge 10 detecting that a bottle B is not present on the tray 9. Once the filler spout 11 is in the cleaning position, the control unit UC causes the first actuator 17 to allow liquid to flow through the filler spout so as to form a substantially hollow jet inside the cleaning manifold 16. The liquid inserted into the cleaning manifold 16 then flows into a drain pipe 16.3 of said cleaning manifold 16.

Once the filler spout 11 has been cleaned, the control unit UC causes the first actuator 17 to stop the flow of liquid, and then causes the second actuator 15 to raise the filler spout 11 into the disengaged position. Naturally, while cleaning the filler spout, the "product" liquid is replaced by a cleaning liquid for cleaning the various elements of the filler device 1 through which the liquid flows, without degrading them.

The control unit UC can thus be programmed to cause the filler spout 11 to be cleaned automatically, i.e. without any physical action on the part of an operator, thereby constituting a significant saving in time and correspondingly improving the productivity of the installation and ensuring hygiene that is compatible with filling food products, pharmaceuticals, or cosmetics.

In another embodiment of the invention, the plunger spout 11 is stationary and it is the tray 9 on which the bottle B is placed that is connected to a carriage that is mounted to move vertically. The device then does not have the stationary cleaning manifold 16 or the strain gauge. Under such circumstances, wrong positioning of the bottle B may be detected, by way of example, by directly detecting the electric current flowing through the second actuator 15.

Naturally, the invention is not limited to the embodiments described and covers any variant coming within the ambit of the invention as defined by the claims.

Although, above, the bottle B is filled by a volume metering system (the quantity of liquid that is inserted into the bottle B is determined by measuring the weight of said bottle B by means of the strain gauge 10), it could equally well be filled by a flow measuring system. By way of example, the valve of the filler spout 11 may be fitted with a flowmeter that is connected to the control unit UC in such a manner that the control unit UC controls the first actuator 17 on the basis of measurements from the flowmeter.

Although, above, the filler device 1 is of the rotary type, other types can be envisaged, and in particular a filler device of the type that moves in translation.

The numbers of trays 9, of carriages 13, and of filler spouts 11 may naturally be different from the numbers in the filler device 1 described and shown above.

The outlet orifices 6.2 may naturally be arranged differently from the arrangement of the filler device 1 shown in FIGS. 1 to 3. The outlet orifice 6.2 may be axial.

The top surface of the tray 9 may be shaped so as to match the bottom surface B1 of the bottle B, thereby improving the accuracy with which said bottle B is positioned on the tray 9.

The tray 9 could be replaced by a plate that is arranged to receive the neck of a said bottle B so as to hold the bottle B under the filler spout 11.

The invention claimed is:

1. A filler device for filling a bottle with liquid, the device comprising a support member for supporting the bottle and a filler spout arranged above the support member so that at least one of the support member and the filler spout is movable between a start-of-filling position and an end-of-filling position, the filler spout comprising a tubular body having an upper portion connected to a liquid distribution circuit and having a lower portion shaped as a cannula, a valve being mounted inside the tubular body to be movable between an open position and a closed position, the filler device being characterized in that it includes a first electromechanical actuator connected to the valve to move it between its two positions, a second electromechanical actuator connected to at least one of the support member and the filler spout to move it between its two positions throughout the time the bottle is being filled, and electronic means for controlling and synchronizing the two actuators relative to each other.

2. The filler device according to claim 1, wherein the support member for supporting the bottle comprises a tray arranged to receive the bottom of the bottle.

3. The filler device according to claim 1, wherein the support member for supporting the bottle comprises a plate arranged to receive the neck of the bottle.

4. The filler device according to claim 1, wherein the filler spout and the support member for supporting the bottle are mounted on a turret that is rotatable about a substantially vertical axis.

5. The filler device according to claim 1, wherein the first actuator and/or the second actuator is a servomotor, a stepper motor, or a linear electromagnetic actuator.

6. The filler device according to claim 1, including a cleaning manifold arranged under the bottle support member, the second actuator enabling the filler spout to be moved towards a cleaning position in which the free end of the filler cannula is engaged in an inlet orifice of the cleaning manifold, the start-of-filling position lying between the end-of-filling position and the cleaning position.

7. The filler device according to claim 1, including a measurement unit for measuring the quantity of liquid contained in the bottle.

8. The filler device according to claim 7, wherein the support member includes a strain gauge arranged to measure the weight of the bottle and connected to the measurement unit, which is arranged to calculate the quantity of liquid inserted into said bottle from the weight of the bottle.

9. The filler device according to claim 7, including a control unit arranged to control the first actuator as a function of the quantity of liquid and to control the second actuator so as to move at least one of the support member and the filler spout from the start-of-filling position towards the end-of-filling position as a function of the quantity of liquid measured by the measurement device.

10. A dispensing method making use of a filler device according claim 5, the method comprising the following steps:

installing a bottle on the support member;

controlling the second actuator to move at least one of the support member and the filler spout from the end-of-filling position to the start-of-filling position;

controlling the first actuator to move the valve from the closed position to the open position;

controlling the second actuator to move at least one of the support member and the filler spout from the start-of-filling position to the end-of-filling position;

when the quantity of liquid measured by the measurement means reaches a predetermined value, controlling the first actuator to move the valve from the open position to the closed position;

when at least one of the support member and the filler spout is in the end-of-filling position, removing the bottle from the support means.

11. The dispensing method according to claim 10, including a prior step of measuring the height of a bottle and of setting the control of the second actuator to adjust the height of the end-of-filling position as a function of the height of the bottle.

12. The method according to claim 10, including a step of adjusting the travel speed of at least one of the support member and the filler spout as imparted by the second actuator as a function of at least one of the following parameters:

the shape of the bottle;

the viscosity of the liquid;

the desired rate of filling.

13. The method according to claim 10, including a step of adjusting a relationship for moving the valve of the filler spout by the first actuator as a function of at least one of the following parameters:

the shape of the bottle;

the viscosity of the liquid;

the desired rate of filling.

* * * * *